(12) United States Patent
Fang et al.

(10) Patent No.: US 9,025,954 B2
(45) Date of Patent: May 5, 2015

(54) DELIVERING DOWNSTREAM DATA IN ETHERNET PON OVER COAX NETWORK

(71) Applicant: Futurewei Technologies, Inc., Plano, TX (US)

(72) Inventors: Liming Fang, Cupertino, CA (US); Jim Chen, Corona, CA (US); Li Zhang, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 82 days.

(21) Appl. No.: 13/788,833

(22) Filed: Mar. 7, 2013

(65) Prior Publication Data

US 2013/0236177 A1 Sep. 12, 2013

Related U.S. Application Data

(60) Provisional application No. 61/607,733, filed on Mar. 7, 2012.

(51) Int. Cl.
| | |
|---|---|
| *H04L 1/00* | (2006.01) |
| *H04B 3/46* | (2006.01) |
| *H04L 12/28* | (2006.01) |
| *H04B 10/25* | (2013.01) |
| *H04L 5/00* | (2006.01) |

(52) U.S. Cl.
CPC .......... *H04L 1/0003* (2013.01); *H04L 12/2801* (2013.01); *H04L 12/2861* (2013.01); *H04L 12/2869* (2013.01); *H04L 12/2885* (2013.01); *H04B 10/25* (2013.01); *H04L 5/0007* (2013.01); *H04L 5/0039* (2013.01); *H04L 5/0044* (2013.01); *H04L 5/0082* (2013.01)

(58) Field of Classification Search
CPC ............. H04J 14/0281; H04J 14/0226; H04Q 11/0067
USPC ................................................. 398/43, 66, 65
See application file for complete search history.

(56) References Cited

U.S. PATENT DOCUMENTS

2002/0067802 A1* 6/2002 Smith et al. ................... 379/1.04

(Continued)

FOREIGN PATENT DOCUMENTS

| | | |
|---|---|---|
| EP | 2251999 A1 | 11/2010 |
| WO | 2011031831 A1 | 3/2011 |

OTHER PUBLICATIONS

Chen, J., "An Example of Designing a Coax Convergence Layer in EPoC," Huawei, XP002713588, Jun. 22, 2012, 9 pages.

(Continued)

*Primary Examiner* — Oommen Jacob
(74) *Attorney, Agent, or Firm* — Conley Rose, P.C.; Grant Rodolph; Jonathan K. Polk

(57) ABSTRACT

An apparatus comprising a processor configured to obtain one or more plant conditions regarding at least one of a plurality of customer premises equipment (CPEs) remotely coupled to the apparatus via electrical lines, and divide the plurality of coupled CPEs into a number of profile groups based on the one or more plant conditions, wherein each profile group comprises at least one CPE and supports one or more modulation orders.

18 Claims, 12 Drawing Sheets

(56) References Cited

U.S. PATENT DOCUMENTS

| | | | |
|---|---|---|---|
| 2004/0085976 A1* | 5/2004 | Dale et al. | 370/411 |
| 2005/0089009 A1* | 4/2005 | Raleigh et al. | 370/349 |
| 2005/0243837 A1* | 11/2005 | Boyd et al. | 370/395.52 |
| 2005/0286500 A1* | 12/2005 | Minami | 370/352 |
| 2007/0223512 A1* | 9/2007 | Cooper et al. | 370/437 |
| 2009/0154927 A1* | 6/2009 | Oksman | 398/76 |
| 2009/0190498 A1* | 7/2009 | Mower et al. | 370/254 |
| 2010/0074167 A1* | 3/2010 | Dale et al. | 370/321 |
| 2010/0157824 A1* | 6/2010 | Thompson et al. | 370/252 |
| 2010/0177645 A1* | 7/2010 | Kang et al. | 370/252 |
| 2010/0260259 A1* | 10/2010 | Kimmich et al. | 375/240.07 |
| 2011/0164491 A1* | 7/2011 | Ma et al. | 370/210 |
| 2011/0202956 A1* | 8/2011 | Connelly et al. | 725/38 |
| 2012/0023522 A1* | 1/2012 | Anderson et al. | 725/35 |
| 2012/0106346 A1* | 5/2012 | Aguirre et al. | 370/237 |
| 2012/0257893 A1* | 10/2012 | Boyd et al. | 398/58 |
| 2013/0236177 A1* | 9/2013 | Fang et al. | 398/66 |

OTHER PUBLICATIONS

Foreign Communication From a Counterpart Application, PCT Application PCT/US2013/029627, International Search Report dated on Jun. 24, 2013, 4 pages.

Foreign Communication From a Counterpart Application, PCT Application PCT/US2013/029627, Written Opinion dated Jun. 24, 2013, 4 pages.

"Broadcom Introduces DOCSIS®-based EoC for EPON Product Portfolio in Support of China's Network Convergence," Press Release, HANGZHOU, Oct. 27, 2010, /PRNewswire via COMTEX News Network/—ICTC 2010—Broadcom Corporation, 2 pgs.

"Operating the EPON Protocol over Coaxial Distribution Networks Call for Interest," IEEE 802.3 Ethernet Working Group, Atlanta, Georgia, Nov. 8, 2011, pp. 1-38.

IEEE Std 802.3,"Part 3: Carrier Sense Multiple Access with Collision Detection (CSMA/CD) Access Method and Physical Layer Specifications,"—Section 5, 2008, pp. 1-615.

* cited by examiner

Algorithm. DL-MAP generation.

DSYM_COUNTER                              ; downstream symbol counter at CMC
num_PRB                                   ; number of PRBs in a symbol
bits_per_PRB[LLID]                        ; bit-loading table
FRAME : {LLID, length}                    ; format of Ethernet frame
DL_MAP[SYM_NO][PRB_NO]                    ; format of DL-MAP DSYM_COUNTER = (DSYM_COUNTER + 1) % 75    ; point to next symbol while (PRB table is not empty)
    Frame = get the next frame from the PON buffer
    for (i = 0; DL_MAP[DSYM_COUNTER][i] != 0; i = i + 1)   ; find empty PRB in symbol
    end for
    needed = Frame.length                 ; get the length of the frame
    while (needed > 0)
        DL_MAP[DSYM_COUNTER][i] = Frame.LLID   ; allocate PRBs for entire grant
        needed = needed − bits_per_PRB[LLID]   ; allocate PRB to LLID
    end while
end while

*FIG. 10*

DELIVERING DOWNSTREAM DATA IN ETHERNET PON OVER COAX NETWORK

CROSS-REFERENCE TO RELATED APPLICATIONS

The present application claims priority to U.S. Provisional Patent Application No. 61/607,733 filed Mar. 7, 2012 by Liming Fang et al. and entitled "Method and Apparatus of Delivering Downstream Data in Ethernet PON over Coax Network (EPoC)", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is a system for providing network access over "the last mile." In a downstream direction, the PON may be a point-to-multi-point (P2MP) network comprising an optical line terminal (OLT) at a central office, an optical distribution network (ODN), and a plurality of optical network units (ONUs) at customer premises. Ethernet passive optical network (EPON) is a PON standard developed by the Institute of Electrical and Electronics Engineers (IEEE) and specified in IEEE 802.3ah, which is incorporated herein by reference as if reproduced in its entirety. EPON may provide a simple and flexible way of using optical fiber for broadband service in the last mile.

In EPON, a fiber may be used for both upstream and downstream transmissions with different wavelengths. The optical line terminal (OLT) may implement an EPON media access control (MAC) layer for transmission of Ethernet frames. A multi-point control protocol (MPCP) may perform various services such as bandwidth assignment, bandwidth polling, auto-discovery, and ranging. Ethernet frames may be broadcasted downstream based on a logical link identifier (LLID) embedded in a preamble of each frame. On the other hand, upstream bandwidth may be assigned based on the exchange of Gate and Report messages between messages between an OLT and an ONU.

Recently, hybrid access networks employing both EPON and other network types have attracted growing attention. For example, Ethernet over Coax (EoC) may be a generic name used to describe all technologies that transmit Ethernet frames over a unified optical-coaxial (coax) network. Examples of EoC technologies may include EPON over coax (EPoC), data over cable service interface specification (DOCSIS), multimedia over coax alliance (MoCA), G.hn (a common name for a home network technology family of standards developed under the International Telecommunication Union (ITU) and promoted by the HomeGrid Forum), home phoneline networking alliance (HPNA), and home plug audio/visual (A/V). EoC technologies may have been adapted to run outdoor coax access from an ONU to an EoC head end with connected customer premises equipment (CPEs) located in subscriber homes.

There is a rising demand to use EPON as an access system to interconnect with multiple coax cables to terminate coax network units (CNUs) located in a subscriber's home with an EPoC architecture. However, in a traditional EPoC system, a coaxial line terminal (CLT) may modulate all downstream data using a common quadrature amplitude modulation (QAM) order, and then broadcast modulated symbols to all CNUs remotely coupled to the CLT, regardless of their respective channel conditions. Similarly, in other hybrid access networks, such as a traditional DOCSIS system, a hybrid fiber coax (HFC) may modulate all downstream data using the same QAM order and broadcast all symbols to all cable modems (CMs) remotely coupled to the HFC. Thus, to improve channel efficiency, it is desirable to modulate and transmit downstream data adaptively based on channel conditions of CPEs.

SUMMARY

In one embodiment, the disclosure includes an apparatus comprising a processor configured to obtain one or more plant conditions regarding at least one of a plurality of customer premises equipment (CPEs) remotely coupled to the apparatus via electrical lines, and divide the plurality of coupled CPEs into a number of profile groups based on the one or more plant conditions, wherein each profile group comprises at least one CPE and supports one or more modulation orders.

In another embodiment, the disclosure includes a method implemented in a middlebox remotely coupled to a plurality of CPEs, the method comprising obtaining one or more plant conditions regarding at least one of the plurality of coupled CPEs, dividing the plurality of coupled CPEs into a number of profile groups based on the plant conditions, wherein each profile group supports one or more modulation orders, wherein each of the profile groups is identifiable by each of a number of group identifiers (IDs), and for each of the profile groups, storing a group ID and one or more corresponding modulation orders.

In yet another embodiment, the disclosure includes a middlebox comprising a processor configured to generate a first plurality of modulation symbols by modulating a first plurality of Ethernet frames based on a first modulation profile, and generate a second plurality of modulation symbols by modulating a second plurality of Ethernet frames based on a second modulation profile, wherein each of the first and second modulation profiles supports one or more modulation orders, at least one transmitter coupled to the processor and configured to transmit the first plurality of modulation symbols to a first group of a CPEs remotely coupled to the middlebox, and transmit the second plurality of modulation symbols to a second group of a CPEs remotely coupled to the middlebox.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 10 shows an embodiment of an algorithm in the form of pseudo-codes.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, apparatus, and methods for improving downstream data transmission in a hybrid access network, such as an EPoC or a DOCSIS network. Using an EPoC as an example, according to an embodiment disclosed herein, a plurality of CNUs remotely coupled to a CLT may be divided into a number of profile groups based on plant or cable conditions obtained by the CLT. Each profile group may correspond to a modulation profile that supports one or more modulation orders. The CLT may further allocate subcarriers or physical resource blocks (PRBs) available in a downstream communication channel between the CLT and the CNUs. In an embodiment, the CLT may receive downstream Ethernet frames from an OLT, and may modulate the Ethernet frames onto subcarriers using orthogonal frequency-division multiplexing (OFDM)-based modulation based on the PRB allocation and specified modulation profiles. Further, the CLT may transmit multiple broadcast streams to multiple groups of CNUs, wherein each of the streams may be sent only to a specific profile group. Thus, downstream data delivery may be a local broadcast or unicast instead of a global broadcast. Embodiments taught herein may allow downstream data delivery better adapted to changing plant conditions, thus improving quality and/or efficiency of data transmission.

Figure 1:
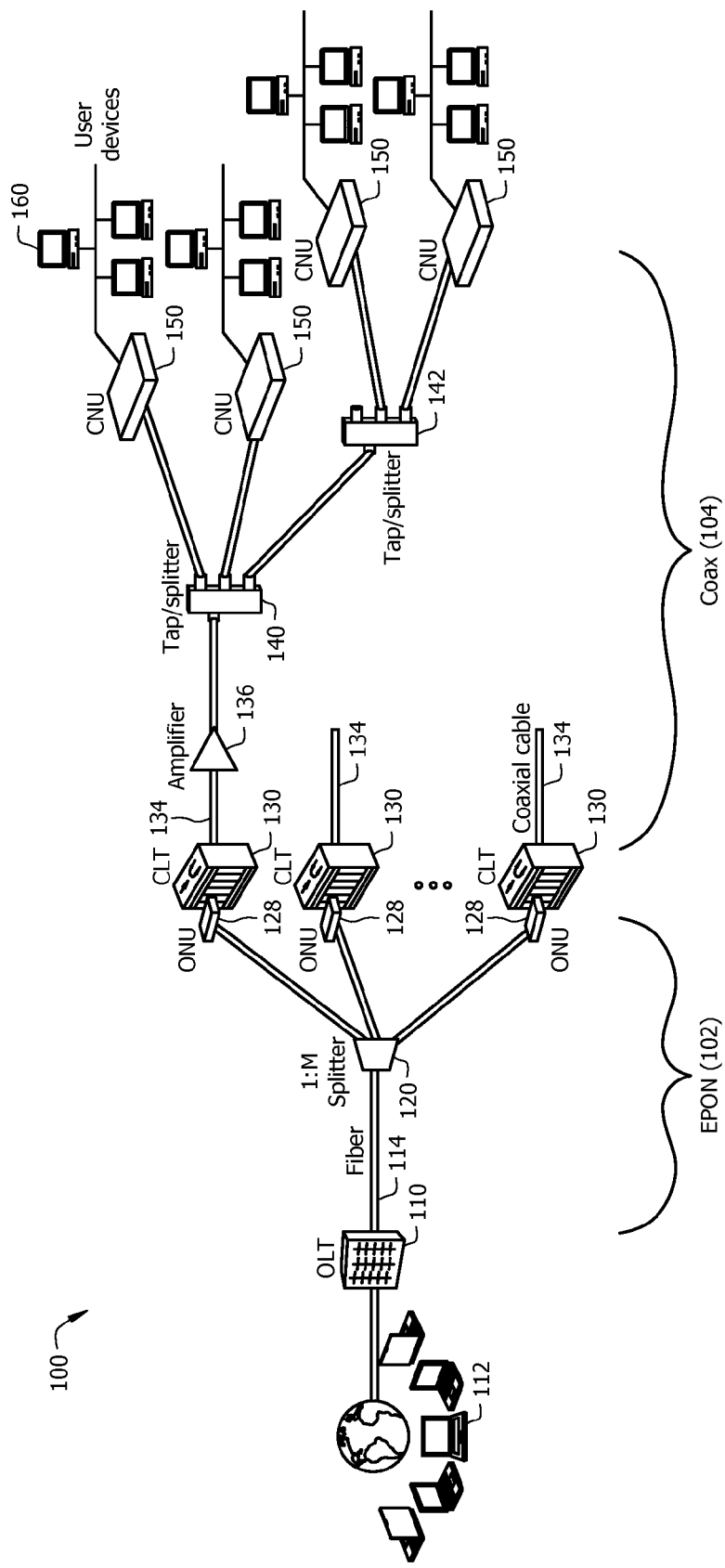
FIG. 1 illustrates an embodiment of an EPoC network.

Refer now to FIG. 1, which illustrates an embodiment of an EPoC network 100 comprising an optical portion or segment 102 and an electrical segment 104. The optical segment 102 may essentially be a PON and the electrical segment 104 may be a coaxial cable network. The optical segment 102 may comprise an OLT 110 and one or more ONUs 128 coupled to the OLT 110 via an optical distribution network (ODN). The ODN may comprise an optical line or fiber 114 and an optical splitter 120 that couples the OLT 110 to an ONU 128. Similarly, the electrical segment 104 may comprise one or more CLTs 130, each of which may be coupled to a plurality of CNUs 150 via an electrical distribution network (EDN). The EDN may comprise coax cables 134, amplifiers 136 (only one shown as an example), and cable taps or splitters 140 and 142.

In the EPoC network 100, each ONU 128 and its corresponding CLT 130 may be fused together into a single box. The ONU-CLT box may act as a single device, which may reside at the curb or basement of a house or an apartment building. The ONU-CLT box may form an interface between the optical and electrical segments 102 and 104. Following convention in the art, unless otherwise noted, hereinafter a box including an ONU 128 and a CLT 130 may simply be referred to as a CLT 130 that has ONU functionalities. It should be understood that the EPoC network 100 may comprise any number of CLTs 130 and corresponding CNUs 150 for each OLT 110. The components of the EPoC network 100 may be arranged as shown in FIG. 1 or any other suitable arrangement.

The optical segment 102 may be a communication network that does not require any active components to distribute data between the OLT 110 and the CLTs 130. Instead, the optical segment 102 may use the passive optical components in the ODN to distribute data between the OLT 110 and the CLT 130. The optical fiber 114 may have any suitable rating, such as 1 or 10 Giga bits per second (Gbps). Examples of suitable protocols that may be implemented in the optical segment 102 to include asynchronous transfer mode PON (APON) and the broadband PON (BPON) defined by the ITU Telecommunication Standardization Sector (ITU-T) G.983 standard, Gigabit PON (GPON) defined by the ITU-T G.984 standard, the EPON defined by the IEEE 802.3ah standard, and the wavelength division multiplexing (WDM) PON (WDM-PON).

The OLT 110 may be any device configured to communicate with the CNUs 150 via the CLT 130. The OLT 110 may reside in a local exchange, which may be a central office (CO). Further, the OLT 110 may couple or connect the EPoC network 100 to another network 112, which be any type of network such as an Internet, synchronous optical network (SONET), or asynchronous transfer mode (ATM) backbone. For example, the OLT 110 may act as an intermediary between the CLTs 130 and the network 112. Specifically, the OLT 110 may forward data received from the network 112 to the CLTs 130, and forward data received from the CLTs 130 onto the network 112. Although the specific configuration of the OLT 110 may vary depending on the type of optical protocol implemented in the optical segment 102, in an embodiment, the OLT 110 may comprise an optical transmitter and an optical receiver. When the network 112 is using a network protocol that is different from the protocol used in the optical segment 102, the OLT 110 may comprise a converter that converts the protocol of the network 112 to the protocol of the optical segment 102. The OLT converter may also convert the optical segment 102 protocol into the network 112 protocol.

The ODN between the OLT 110 and the CLTs 130 may be a data distribution system that may comprise optical fiber cables, couplers, splitters, distributors, and/or other equipment. In data transmission, Ethernet packets from the OLT 110 may pass through a 1×M passive splitter or a cascade of splitters and reach each of the CLTs 130, where M may denote a number of CLTs in the EPoC network 100. M may have any suitable value, such as 4, 8, or 16, and may be decided by an operator depending on factors like an optical power budget. Thus, packets may be broadcasted by the OLT 110 and selectively extracted by the CLTs 130. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the CLTs 130. It should be noted that, if needed, the optical fiber cables may be replaced by any optical transmission media. In some embodiments, the ODN may comprise one or more passive or active optical amplifiers. The ODN may extend from the OLT 110 to the CLTs 130 including ONUs in a branching configuration as shown in FIG. 1, but may be alternatively configured as determined by a person of ordinary skill in the art.

The CLTs 130, sometimes referred to as fiber coax units (FCUs), may be remotely coupled to the OLT 110. In some embodiments, one or more CLTs may be located within the OLT 110. In the downstream direction, each CLT 130 may be any device or component configured to receive downstream data from the OLT 110, process the downstream data, and transmit the processed downstream data to corresponding CNUs 150. The CLT 130 may convert the downstream data appropriately to transfer the data between the optical segment 102 and the electrical segment 104. Although terms "upstream" and "downstream" may be used throughout to denote the locations of various network features relative to the OLT or similar unit, those skilled in the art will appreciate that the data flow on the network in the embodiments of the disclosure is bi-directional. Downstream data received by a CLT 130 may be in the form of optical signals, and downstream data transmitted by a CLT 130 may be in the form of electrical signals that may have a different logical structure as compared with the optical signals. In some embodiments, the CLT 130 is transparent to the CNUs 150 and the OLT 110 in the sense that downstream data sent from the OLT 110 to the CNU 150 may be directly addressed to the CNU 150 (e.g. using a LLID or a destination address), and vice-versa. As such, the CLT 130 intermediates between network segments, namely an optical segment 102 and an electrical segment 104 in the example of FIG. 1.

The electrical segment 104 of the EPoC network 100 may be similar to any known electrical communication system. For example, the electrical segment 104 may also be a P2MP network. Downstream data from a CLT 130 may pass through amplifier(s) and a tap or splitter or a cascade of taps or splitters to reach one or more CNUs 150. In an embodiment, downstream data transmission from a CLT 130 to CNUs 150 may not be a broadcast; instead, a media access plan (MAP) may be used to allocate different sub-carrier groups to different CNUs using orthogonal frequency-division multiple access. Thus, in some cases, downstream transmissions may be unicast from the OLT 110 to the CNUs 150.

The electrical segment 104 may not require any active components to distribute data between the CLTs 130 and the CNUs 150. Instead, the electrical segment 104 may use the passive electrical components in the electrical segment 104 to distribute data between the CLTs 130 and the CNUs 150. Alternatively, the electrical segment 104 could use some active components, such as amplifiers 136. Examples of suitable protocols that may be implemented in the electrical segment 104 include MoCA, G.hn, HPNA, and Home Plug A/V, etc. The EDN between the CLTs 130 and the CNUs 150 may be a data distribution system that comprises electrical cables (e.g. coaxial cable and twisted wires), couplers, splitters, distributors, and/or other equipment. In an embodiment, the electrical cables, couplers, splitters, distributors, and/or other equipment are passive electrical components. Specifically, the electrical cables, couplers, splitters, distributors, and/or other equipment may be components that do not require any power to distribute data signals between the CLT 130 and the CNU 150. It should be noted that, if needed, the electrical cables may be replaced by any electrical transmission media. In some embodiments, the EDN may comprise one or more electrical amplifiers 136. The EDN may extend from each CLT 130 to its corresponding CNUs 150 in a branching configuration as shown in FIG. 1, but may be alternatively configured as determined by a person of ordinary skill in the art.

In an embodiment, each CNU 150 may be any device configured to communicate with the OLT 110, the CLT 130, and any user devices 160. Specifically, the CNUs 150 may act as an intermediary between the OLT 110 and the user devices 160. For example, each port of the OLT 110 may serve 32, 64, 128, or 256 CNUs, and depending on the number of CNUs present in the EPoC network 100, a suitable number (e.g., 4, 8, or 16) of CLTs 130 may be deployed per OLT port. An examplary distance between the OLT 110 and a CLT 130 may be in the range of 10 to 20 kilometers, and an examplary distance between a CLT 130 and a CNU 150 may be in the range of 100 to 500 meters. Further, each CNU 130 may serve any suitable number (e.g., 3 or 4) of subscribers or user devices 160. For instance, the CNUs 150 may forward data received from the OLT 110 to the user devices 160, and forward data received from the user devices 160 onto the OLT 110.

Although the specific configuration of the CNUs 150 may vary depending on the type of network 100, in an embodiment a CNU 150 may comprise an electrical transmitter configured to send electrical signals to a CLT 130 and an electrical receiver configured to receive electrical signals from the CLT 130. Additionally, the CNU 150 may comprise a converter that converts the electrical signal into electrical signals for the user devices 160, such as signals in an ATM protocol, and a second transmitter and/or receiver that may send and/or receive the electrical signals to the user devices 160. In some embodiments, CNUs 150 and coaxial network terminals (CNTs) are similar, and thus the terms are used interchangeably herein. The CNUs 150 may typically be located at end-user locations, such as the customer premises, but may be located at other locations as well.

The user devices 160 may be any devices configured to interface with a user or subscriber. For example, the user devices 160 may include desktop computers, laptop computers, tablets, mobile phones, smartphones, telephones, mobile telephones, residential gateways, televisions, set-top boxes, and so forth.

Figure 2:
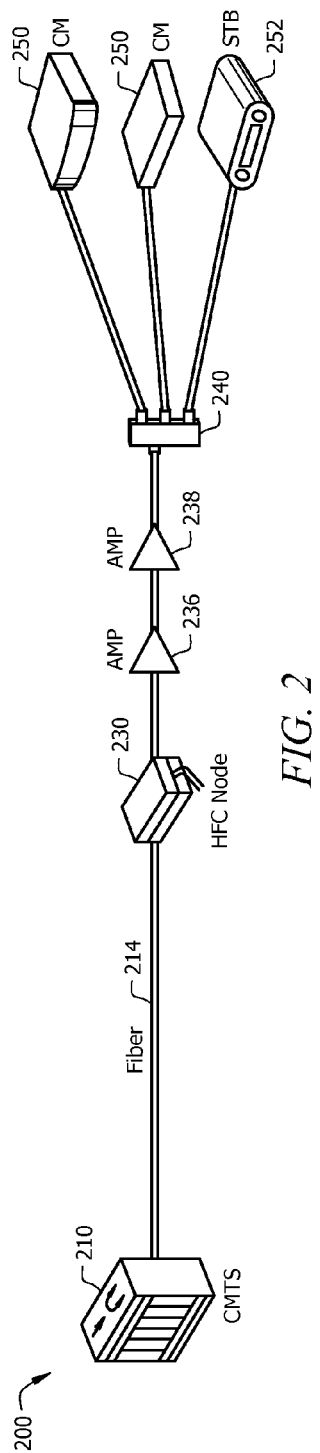
FIG. 2 illustrates an embodiment of a DOCSIS network.

FIG. 2 illustrates an embodiment of a DOCSIS network 200, which may be structurally similar to the EPoC network 100. The DOCSIS network 200 may comprise a cable modem termination system (CMTS) 210, at least one HFC node 230, any number of cable modems (CMs) 250 and/or set-top box (STB) 252 arranged as shown in FIG. 2. Specifically, the HFC node 230 may be coupled to the CMTS 210 via an optical fiber 214, and the CMs 250 and/or STB 252 may be coupled to the HFC node 230 via electrical cables, one or more amplifiers (e.g., amplifiers 236 and 238), and at least one splitter 240). In implementation, the CMTS 210 may be considered equivalent or similar to the OLT 110 in FIG. 1, the HFC node 230 may be considered equivalent or similar to a CLT 130 in FIG. 1, and a CM 250 or a STB 252 may be considered equivalent or similar to a CNU 150 in FIG. 1. Note that the HFC node 230 may be remotely coupled to the CMTS 210, or sometimes reside in the CMTS 210. The CMTS 210 may sometimes be equipped with part or all of the functionalities of the HFC node 230. For example, methods and schemes taught herein (e.g., division of profile groups and PRB allocations, and downstream transmission to CMs 250 or STB 252) may be implemented by the CMTS 210 if desired. Instead of using a LLID, each CM 250, or STB 252, or each service in a CM 250, or each service in a STB 252, may be identifiable using a destination address (DA). The DA may be contained in a preamble of an Ethernet frame. A person of ordinary skill in the art will recognize similarities between the networks 100 and 200, and that schemes and methods taught by this disclosure will be applicable to the DOCSIS network 200 (adopting minor modifications). Accordingly, in the interest of conciseness the DOCSIS network 200 will not be described as detailed as the EPoC network 100.

Figure 3:
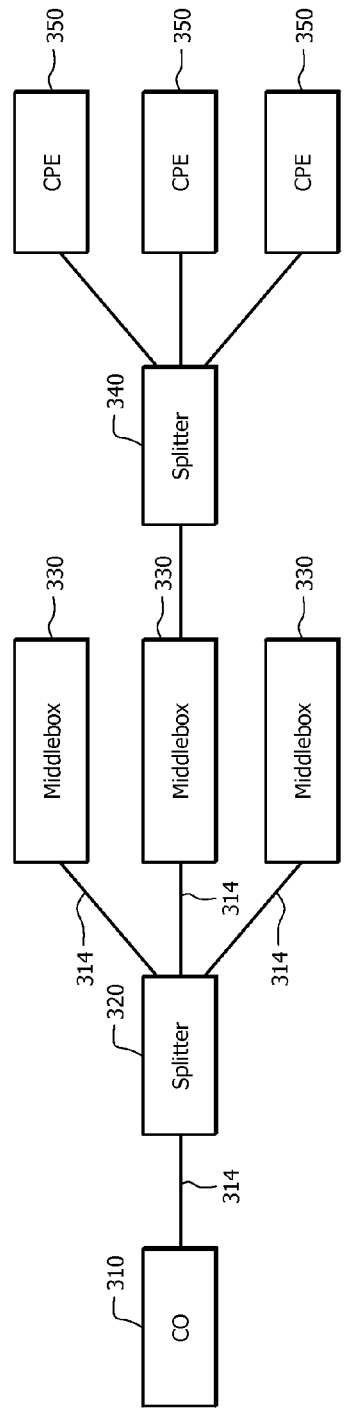
FIG. 3 illustrates an embodiment of a hybrid access network.

Although not illustrated and discussed exhaustively, it should be understood that principles of this disclosure may be applicable to any hybrid access network that employs an optical portion or segment. FIG. 3 illustrates an embodiment of a hybrid access network 300, which may be structurally similar to the EPoC network 100 or the DOCSIS network 200. The network 300 may comprise a CO equipment 310, one or more middleboxes 330, and a plurality of CPEs 350 arranged as shown in FIG. 3. Specifically, the middleboxes 330 may be coupled to the CO equipment 310 via an optical line comprising optical fibers 314 and at least one splitter 320. The CPEs 350 may be coupled to a middlebox 330 via electrical lines comprising electrical cables and at least one splitter 340. Note that a middlebox 330 may be remotely coupled to the CO equipment 310, or sometimes reside in the CO equipment 310. A CPE 350 may be a plug-and-play device from a user's perspective. Further, each CPE 350 may be identifiable using a CPE ID contained in a preamble of an Ethernet frame. This may include some cases where each service in a CPE 350 is identifiable using a CPE ID.

In implementation, the OLT 110 in FIG. 1 or the CMTS 210 in FIG. 2 may be considered a specific case of the CO equipment 310, a CLT 130 or a HFC node 230 may be considered a specific case of the middlebox 330, and a CNU 150 or a CM 250 or a STB 252 may be considered a specific case of the CPE 350. Depending on the application or context, a middlebox 330 may be referred to by various names, including but not limited to: CLT, HFC node, optical coax converter unit (OCU), coax media converter (CMC), media converter (MC), and fiber to coax unit (FCU). A person of ordinary skill in the art will recognize similarities between the networks 100, 200, and 300, and that schemes and methods taught for one specific type of network will be applicable to a more general network, such as the hybrid access network 300 (adopting minor modifications as necessary). Accordingly, in the interest of clarity, in following descriptions examplary embodiments of apparatus, systems, schemes, and methods will mainly direct toward an EPoC network, with the understanding that the same or similar principles may be applied to any general hybrid access network.

Figure 4:
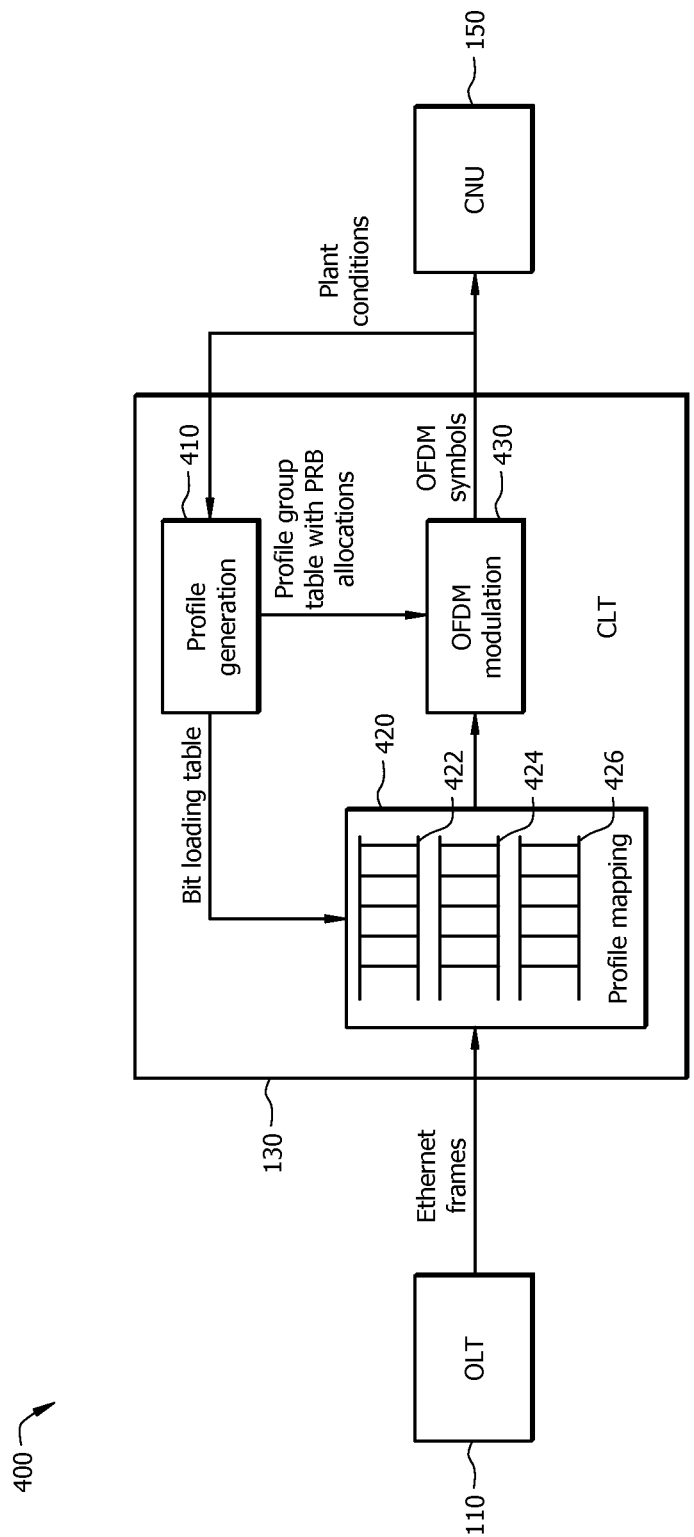
FIG. 4 illustrates an embodiment of part of an EPoC network.

FIG. 4 illustrates an embodiment of part of an EPoC network 400, which comprises an OLT 110, a CLT 130, and a CNU 150. The CLT 130 may comprise a profile generation module 410, which may be configured to classify or divide a plurality of CNUs (including the CNU 150 shown in FIG. 4) into a number of groups based on their channel or plant conditions. Since each CNU or services within each CNU may be identifiable by a LLID, the profile generation module 410 may generate a LLID-profile mapping table and/or a bit-loading table as a result of classification to establish a correspondence between each CNU and its group profile. Note that any type of table may suffice, as long as it comprises group profiles for each CNU connected to the CLT 130 and their LLIDs. Each group may have a modulation profile, which may support one or more modulation orders. Further, the CLT may allocate PRBs to the profile groups, thereby generating a profile group table. PRB allocation may employ frequency division multiplexing, time division multiplexing, or both, which is further described later.

As mentioned previously, in an EPoC network, downstream data packets may be broadcast by an OLT and selectively extracted by its corresponding CLTs. As shown in FIG. 4, Ethernet frames transmitted by the OLT 110 may be received by the CLT 130. Each Ethernet frame comprises a preamble containing a LLID, which may be used to identify a CNU or a service in a CNU. Then, a PON buffer 420 in the CLT 130 may store the received Ethernet frames in LLID-based queues. In an embodiment, the CLT 130 may check the LLID in each Ethernet frame to see if it is present in a bit-loading table or a LLID-profile mapping table. The Ethernet frame is aborted if the LLID is not found in the table; otherwise, the Ethernet frame may be stored in different queues, which may reside in different buffers or different sections of the PON buffer 420.

Further, an OFDM modulation unit or module 430 may be configured to modulate the Ethernet frames to OFDM symbols, which are one type of modulation symbols. Since each group of CNUs may have a different modulation order, the Ethernet frame containing a LLID of a certain CNU is modulated using the modulation order specified for this CNU in the bit-loading table. In addition, subcarriers used in OFDM modulation for this CNU may be based on the profile group table. After modulation, the CLT 130 may finally transmit the OFDM symbols to the CNU 150, along with an allocation MAP containing the PRB allocation information.

OFDM modulation may be considered a conversion of Ethernet frames to fit into fixed-length coax symbols. Unlike PON which may provide a frame-based transmission channel, a coax network may provide a symbol-based transmission channel. As a result, all transmissions in the coax medium may take place in terms of symbols, and data may be sent through a series of symbols. For downstream transmissions in the coax segment of EPoC, orthogonal frequency-division multiple access (OFDMA) may be used, in which case there may be data for a number of CNUs in each OFDM symbol. Different groups of sub-carriers may carry data for different CNUs, and the allocation of subcarriers may be indicated by profile pointers, such as starting subcarriers contained in a downlink-MAP (DL-MAP). Accordingly, Ethernet frames received at the CLT from the OLT need to be cut into fixed length pieces and filled into PRBs for implementing OFDMA.

Figure 5:
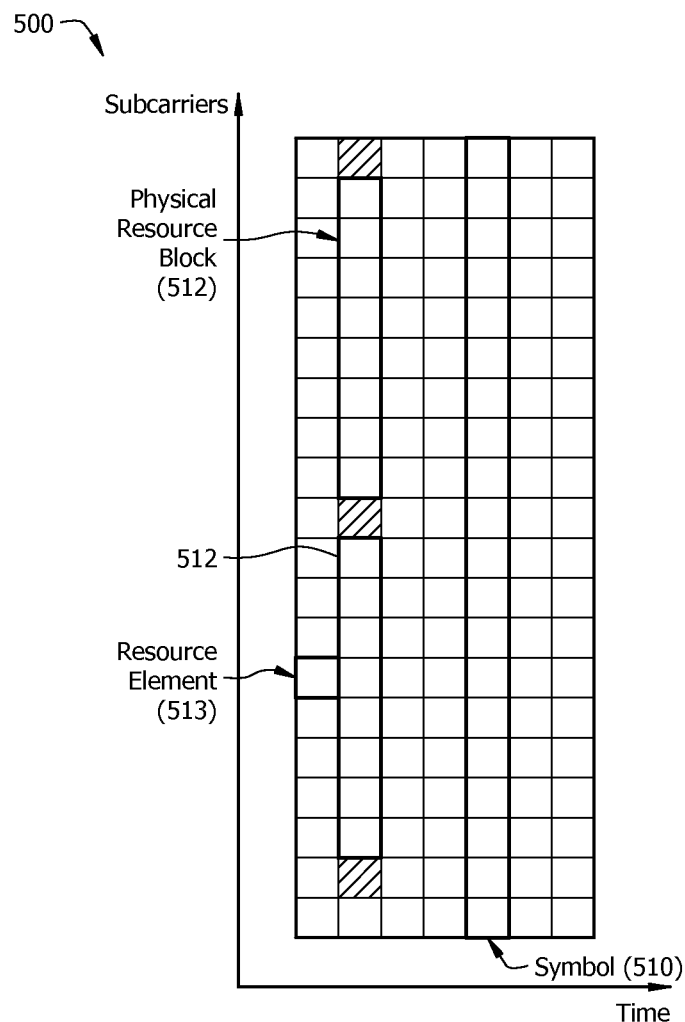
FIG. 5 illustrates an exemplary scheme 500 showing a structure of orthogonal frequency-division multiplexing (OFDM) symbols and physical resource blocks (PRBs).

FIG. 5 illustrates an examplary scheme 500 showing a structure of OFDM symbols and PRBs. As shown in FIG. 5, an OFDM symbol 510 may be divided into a number (e.g., 4 or 8) of PRBs 512 in a frequency domain, and each PRB may comprise a number of resource elements 513. A resource element 513 may correspond to one subcarrier and one symbol length. Depending on the implementation, the OFDM symbol 510 may have any length or duration (e.g., 8 microseconds). A PRB 512 may have the same length as the OFDM symbol 510, or in some embodiments, a PRB 512 may comprise a number (e.g., 6 or 7) of OFDM symbols in the time axis. The PRB may be a basic unit of data transmission in the coax segment of an EPoC network. An OFDM symbol may have any suitable size. For example, if we use 1024-fast Fourier transform (FFT), which uses 1024 subcarriers, and 4096-QAM, then the OFDM symbol size is 1536 bytes. Further, the size of the PRBs 512 may be determined depending on factors such as: 1) maximum simultaneous number of CNUs each symbol has data for; 2) a number of sub-carrier groups, which may equal a number of CNU groups; 3) a number of sub-carriers in each sub-carrier group; and 4) a modulation profile of the sub-carriers. Suppose, for example, a sub-carrier group G has $S_G$ sub-carriers, and say this group is being used to transmit data from a LLID-based queue to a CNU. Say each sub-carrier in G is modulated using a p bits-per-symbol modulation (e.g., a q-QAM employs $\log_2 q$ bits-per-symbol). Then, the size of PRB for sending data to this CNU may be computed as $(S_G \times p)/8$ bytes.

Between Ethernet frames, there may be inter-frame gaps (IFGs), each of which may act as a delimiter for an Ethernet frame. For downstream transmissions, each CLT may queue the received Ethernet frames in LLID-streams, cut the streams into pieces to fill the OFDMA PRB, and transmit the OFDM symbols in units of PRBs. At a receiving end, a CNU may use the IFGs to recover and reconstruct each individual Ethernet frame. For example, a stream comprising 4 Ethernet frames may be cut into 5 PRBs and then transmitted through OFDM symbols. The CNU may receive the 5 PRBs, reconstruct the entire stream comprising the 4 Ethernet frames by concatenating the PRBs, and then recover each individual frame using the IFG delimiters. It should be noted that, as OFDMA may be used for both upstream and downstream transmissions, an upstream frame structure and downstream frame structure for a coax segment may be similar.

Figure 6:
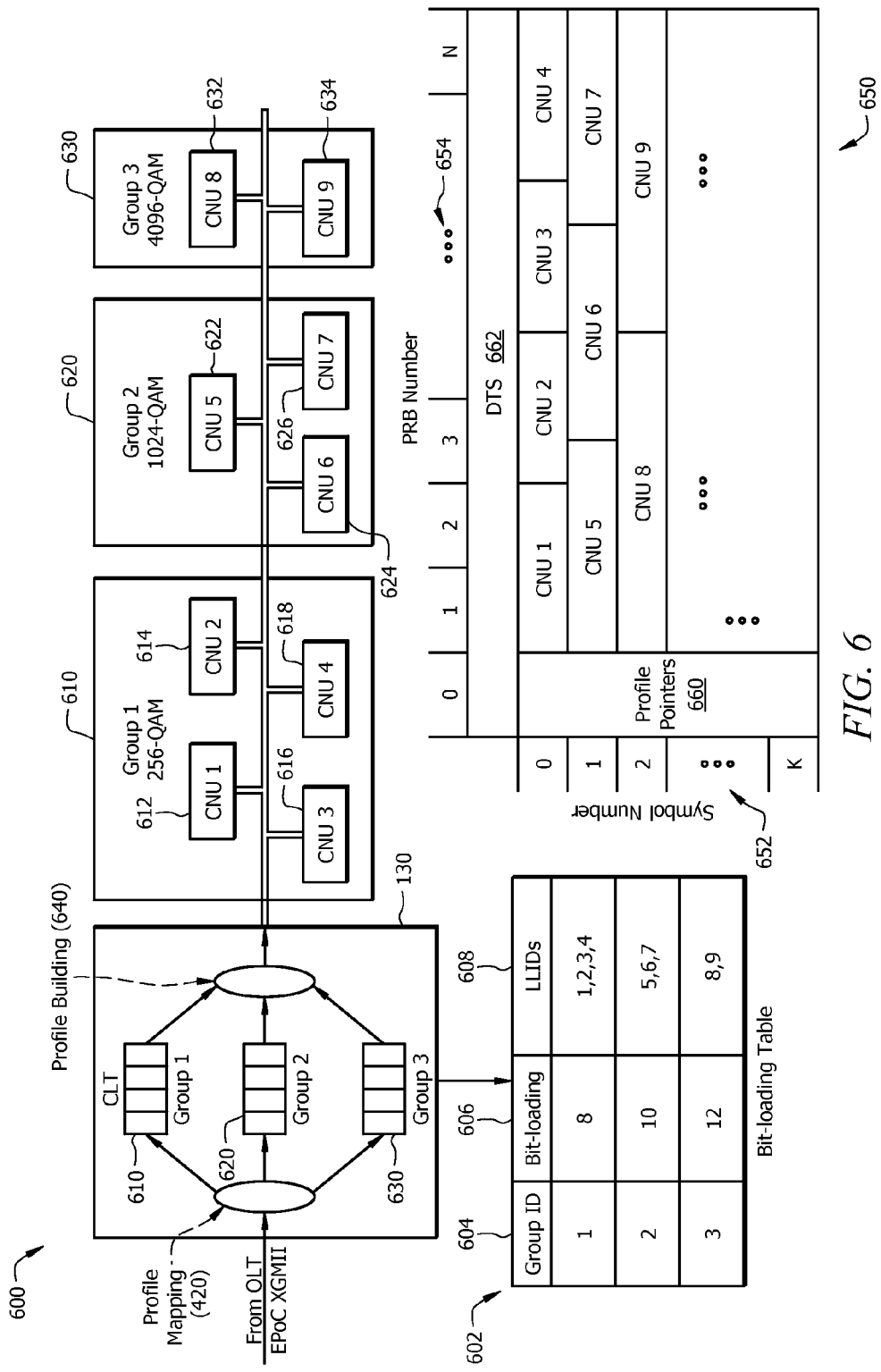
FIG. 6 illustrates an embodiment of a grouping scheme.

FIG. 6 illustrates an embodiment of a grouping scheme 600 implemented by a CLT (e.g., the CLT 130), which supports single modulation coding scheme (SMCS) for each profile group. Although any number of CNUs may be supported by the scheme 600, for illustration purposes, the scheme 600 lists 9 CNUs coupled to the CLT 130 via a coax network. The 9 CNUs are CNUs 612, 614, 616, 618, 622, 624, 626, 632, and 634, which are denoted as CNU 1, CNU 2, . . . , CNU 9, respectively. Recall that the CLT 130 may classify or divide all coupled CNUs into a number of groups, e.g., using a profile building module 640, which may be similar to the profile generation module 410 in FIG. 4. As shown in FIG. 6, the 9 CNUs are divided into 3 groups 610, 620, and 630 which are also denoted as Group 1, Group 2, and Group 3, respectively. The classification may occur during an initialization stage (e.g., initial discovery and CNU registration process) of a communication channel between the CLT 130 and a CNU 150, and may be adaptively updated as the CLT 130 monitors plant conditions or coax cable conditions related to each CNU. Plant conditions may include, but are not limited to, signal to noise ratio (SNR), crosstalk, data rate, cable plant impairment, burst noise, impulse noise from other device(s), cable impedance, any other relevant parameter, and combinations thereof. The CLT 130 may monitor and obtain the plant conditions, and then update its profile group information. In an embodiment, a few fixed profile groups (e.g., Group 1, Group 2, and Group 3) may be created in the CLT 130 (referred to as a middlebox in a general network). For example, initially a CNU may be set to belong to Group 1, which may qualify for 1024-QAM or 10 bit loading. Later, as plant conditions change for this CNU, it may be reassigned to Group 2, which may support a higher order of bit loading (e.g., 4096-QAM), or even a mixture of 1024-QAM and 4096-QAM for different sets of subcarriers.

In the scheme 600, each group may support one modulation order. For example, Group 1 supports 256-QAM, Group 2 supports 1024-QAM, and Group 3 supports 4096-QAM. Via grouping of CNUs, the CLT 130 may generate a bit-loading table 602, which may comprise a plurality of entries (each row may be considered an entry). Further, each entry may comprise a group index or ID 604, a bit-loading per subcarrier 606, and a LLID 608. The group ID 604 may be assigned by the CLT 130 to identify each profile group. The bit-loading per subcarrier 606 is determined by the modulation order. For example, a 256 ($2^8$)-QAM corresponds to a bit-loading of 8 bits per subcarrier. The LLID 608 may be used to identify each CNU. If a CNU is assigned with more than one LLID, the LLID 608 may identify each service in that CNU.

The CLT 130 may further allocate PRBs to OFDM symbols. In an embodiment, a channel profile or group profile table 650 may be generated by the CLT 130 to specify PRB allocation. The group profile table 650 may specify a plurality of PRBs 654. Each PRB may comprise a corresponding group of subcarriers. Illustrated in group profile table 650 are N+1 PRBs, numbered 0, 1, . . . , N. While it would be understood by those skilled in the art that, in principle, N could be any finite integer value, representative values may be N=15 in an embodiment of an electrical segment 104 in FIG. 1, having 24 Mega Hertz (MHz) channels and N=79 in an embodiment having 120 MHz channels. The group profile table 650 also may specify a plurality of OFDM symbols 652. In this illustrative example, there are K+1 symbols, numbered 0, 1, . . . , K. Again, while K could be any finite integer, a representative value may be K=74 in an OFDM frame in, for example, the electrical segment 104 in FIG. 1. In the group profile table 650, a first PRB (numbered 0) may comprise profile pointers 660. The profile pointers 660 may include data such as sub-carrier bit loading schemes (e.g., specified by entries in the bit-loading table 602), forward error correction (FEC) scheme, power level, and other data to inform CLT 130 of the network channel configuration upon initialization of the downstream communication channel, e.g. the communication channel in the electrical segment 104 in FIG. 1.

The group profile table 650 may comprise a downstream timing sequence (DTS), e.g., in symbol 0 or any other symbol. As shown in FIG. 6, the 9 CNUs (or similar network units) may be allocated resources on the downstream communication channel based on frequency or subcarrier division. Allocated resources may comprise one or more PRBs and one or more OFDM symbols (equivalently OFDM time slices). In an embodiment, the frequency division and temporal structure of an OFDM symbol may allow multiple simultaneous transmissions of data to a plurality of CNUs or other such network units. Contiguous PRBs may be assigned for the same network unit. For example, CNU 1 may be assigned two PRBs (numbers 1-2) representing a plurality of OFDM subcarriers in the first OFDM symbol 652 (symbol number 0). CNU 1 may be identified by its corresponding LLID when queued data is transmitted to CNU 1. Similarly, other CNUs may be allocated with PRBs.

Note that in the scheme 600, modulation of data for each group may only use one modulation order. For example, the group 610 comprising CNUs 1-4 may use 256-QAM in OFDM symbol 0, the group 620 comprising CNUs 5-7 may use 1024-QAM in OFDM symbol 1, and the group 630 comprising CNUs 8 and 9 may use 4096-QAM in OFDM symbol 2. Although the application of a group profile table has been described in conjunction with the group profile table 650, it would be readily understood by persons skilled in the art that group profile table 650 is illustrative of the principles of this disclosure, and that implementations of PRB allocation schemes in accordance with these principles are not restricted to the tables depicted in FIG. 6.

In downstream data communication, the CLT 130 receive Ethernet frames from an OLT, e.g., via a 10 Gigabit Media Independent Interface (XGMII). A profile mapping module (e.g., located in a PON buffer 420) may compare the LLIDs carried in Ethernet frames with the LLIDs 608 to determine which CNU group the Ethernet frames are intended for. Then, the Ethernet frames may be modulated according to a modulation order or a bit loading setting as OFDM symbols. PRBs and OFDM symbols are prepared for each group of CNUs and then transmitted. In some embodiments, each group of CNUs may not receive data intended for other groups of CNUs. In this case, downstream transmission may not be a global broadcast; instead, it may be a local broadcast or a unicast (if a group includes only one CNU). In some alternative embodiments, as long as plant conditions permit, a group of CNUs may receive not only data intended for this group but also data intended for other group(s), thereby allowing this group to listen to data processed by multiple profiles.

Figure 7:
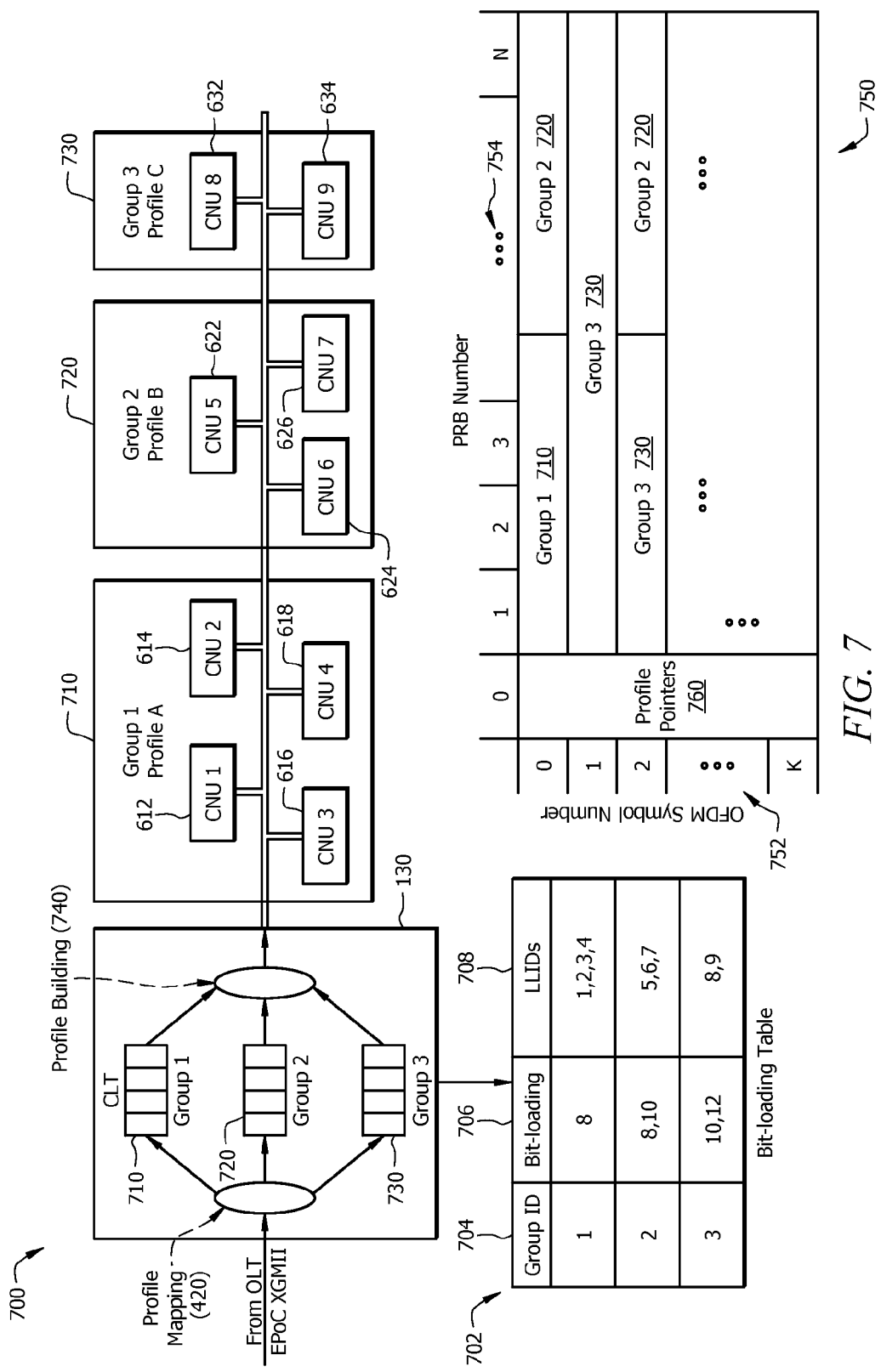
FIG. 7 illustrates an embodiment of another grouping scheme.

FIG. 7 illustrates an embodiment of a grouping scheme 700 implemented by a CLT (e.g., the CLT 130), which supports multiple modulation coding schemes (MMCS) for each profile group. The scheme 700 may be similar to the scheme 600 except that a profile group in the scheme 700 may support multiple modulation orders. In the interest of conciseness, the following description may focus on the differences between the scheme 700 in comparison with the scheme 600. Recall that the CLT 130 may classify or divide all coupled CNUs into a number of groups, e.g., using a profile building module 740, which may be similar to the profile generation module 410 in FIG. 4. As shown in FIG. 7, the 9 CNUs are divided into 3 groups 710, 720, and 730 which are also denoted as Group 1, Group 2, and Group 3, respectively.

In the scheme 700, one or more of the profile groups may have a group profile that supports multiple modulation orders. For example, Group 1 has Profile A that supports only 256-QAM, Group 2 has Profile B that supports 256-QAM and 1024-QAM, and Group 3 has Profile C that supports 1024-QAM and 4096-QAM. Via grouping of CNUs, the CLT 130 may generate a bit-loading table 702, which may comprise a plurality of entries (each row may be considered an entry). Further, each entry may comprise a group index or ID 704, a bit-loading per subcarrier 706, and a LLID 708. Based on the bit-loading table 702, for instance, downstream data intended for a CNU in Group 2 (and identifiable by LLID 5, 6, or 7) may be modulated using 256-QAM and/or 1024-QAM.

In an embodiment, a group profile table 750 may be generated by the CLT 130 to specify PRB allocation. The group profile table 750 may specify a plurality of PRBs 754. Each PRB may comprise a corresponding group of subcarriers. In the group profile table 750, a first PRB (numbered 0) may comprise profile pointers 760, which may include data such as subcarrier bit loading schemes (e.g., specified by entries in the bit-loading table 702), forward error correction (FEC) scheme, power level, and other data to inform CNUs 130 of the network channel configuration upon initialization of the downstream communication channel, e.g. the communication channel in the electrical segment 104 in FIG. 1.

As shown in FIG. 7, the 9 CNUs may be allocated resources on the downstream communication channel. For example, the group 710 may be assigned a first number of PRBs in OFDM symbol 0, and the group 720 may be assigned a second number of PRBs also in the OFDM symbol 0. Further, only the group 730 may be assigned all N PRBs in OFDM symbol 1. The group 730 may be assigned a first number of PRBs in OFDM symbol 2, and the group 720 may be assigned a second number of PRBs also in the OFDM symbol 2. The OFDM symbols 0, 1, and 2 are merely examplary positions of OFDM symbols 752, thus any other symbols may be assigned similarly. Note that the allocation or PRBs are in accordance with the bit-loading table 702.

Figure 8A:
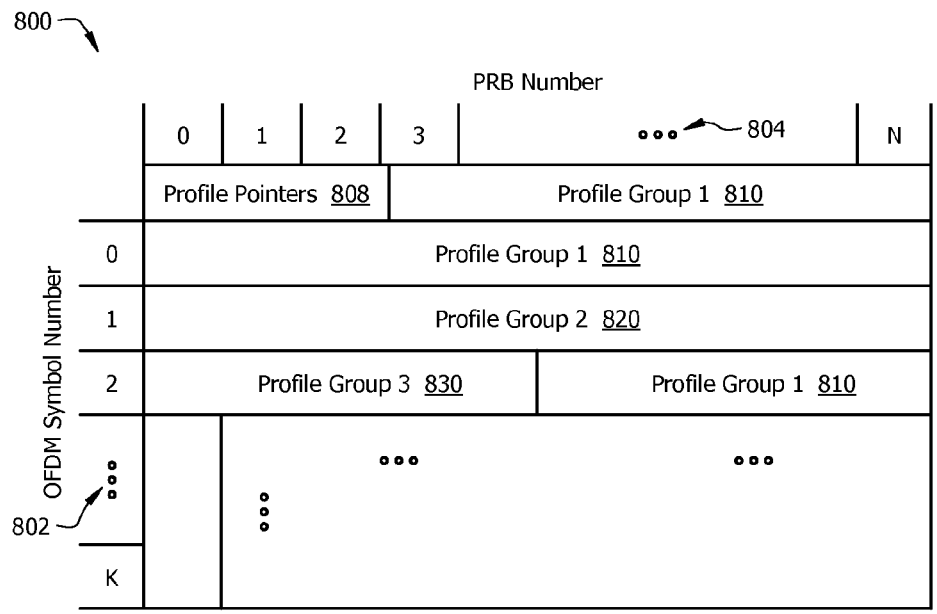
FIGS. 8A and 8B illustrate embodiments of group profile tables.

Although the profile pointers 660 in FIG. 6 and the profile pointers 760 in FIG. 7 are allocated with PRB number 0, it should be noted that, in implementation, profile pointers may be packed in any PRB and/or symbol position, and may have any suitable size. FIG. 8A illustrates an embodiment of a group profile table 800, in which profile pointers 808 are filled into three PRBs (PRBs 0-2 of PRBs 804) but only in one OFDM symbol, which may be any of the OFDM symbols 802. Similar to the group profile table 750, the group profile table 800 may be used for MMCS. As shown in FIG. 8A, a profile group 810 shares one OFDM symbol with the profile pointers, occupies another OFDM symbol entirely for itself, and shares yet another OFDM symbol with a profile group 830. A profile group 820 occupies one OFDM symbol entirely for itself.

Figure 8B:
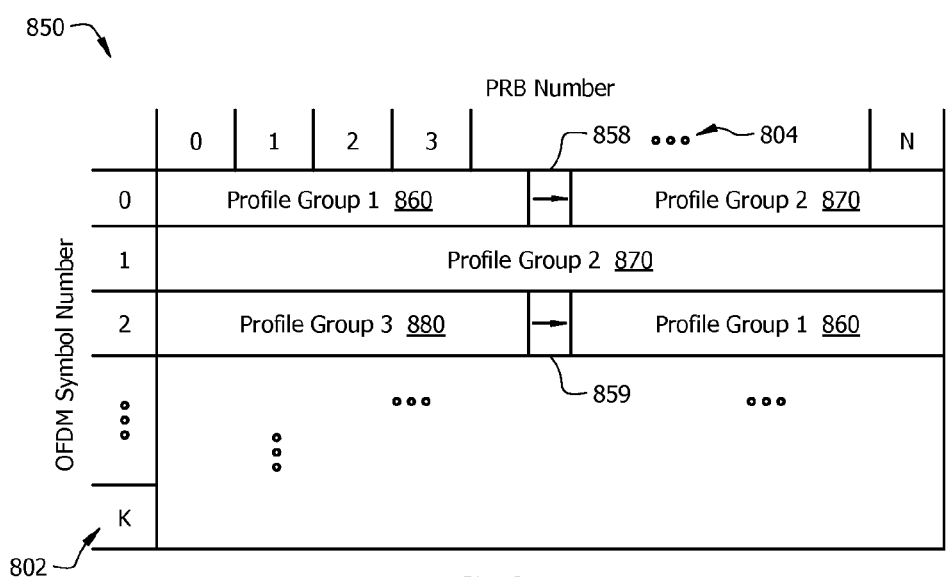

FIG. 8B illustrates another embodiment of a group profile table 850, in which a first profile pointer 858 may be filled into one of the PRBs 804 and in one of the OFDM symbols 802. A second profile pointer 859 may be filled into one of the PRBs 804 and in one of the OFDM symbols 802. The two profile pointers 858 and 859 may use the same PRB or different PRBs. Other profile pointers, if present, may be similarly configured. Similar to the group profile table 800, the group profile table 850 may be used for MMCS. As shown in FIG. 8B, OFDM symbol 0 is shared by a profile group 860, the profile pointer 858, and a profile group 870. OFDM symbol 1 is occupied entirely by the profile group 870. OFDM symbol 2 is shared by a profile group 880, the profile pointer 859, and the profile group 860.

Figure 9A:
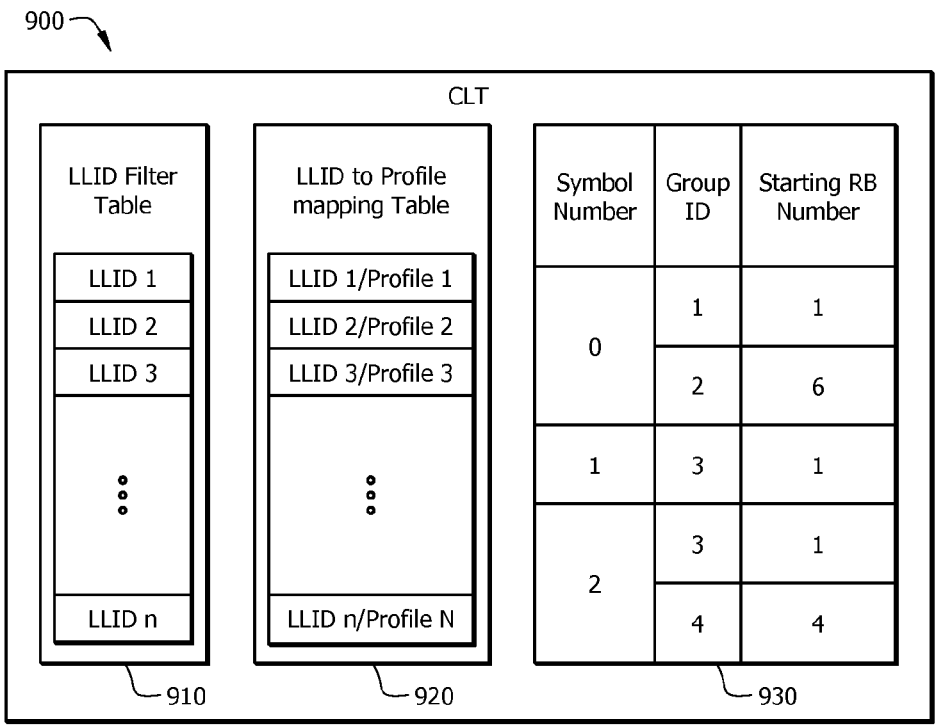
FIGS. 9A and 9B illustrate embodiments of CLTs.

As mentioned previously, any type of table may be utilized by a CLT, as long as a correspondence between each LLID and a group profile or a channel profile may be established. FIG. 9A illustrates an embodiment of a CLT 900, which may utilize various tables or data structures. Examplary tables with examplary values used to demonstrate principles disclosed herein include a LLID filter or lookup table 910, a LLID to profile mapping table 920, and a DL-MAP 930. The LLID filter table 910 may comprise a list of all LLIDs known by the CLT 900, and the LLIDs may be used for identifying CNUs coupled to the CLT 900. In implementation, the LLID filter table 910 may be used as a separate table or as part of another table, such as the mapping table 920 or a bit-loading table. The mapping or routing table 920 may comprise multiple entries to specify which profile a certain CNU (identified by a LLID) belongs to. In this regard, the mapping table 920 may serve similar functions as a bit-loading table. The CLT 900 may use the mapping table 920, or a bit-loading table, or both. The DL-MAP 930 may be considered a type of profile pointer for EPoC systems, or part of the information contained in profile pointers. The DL-MAP 930 may comprise multiple entries containing information regarding symbol numbers, group IDs, and starting RB (short for PRB) numbers or starting subcarrier numbers. The DL-MAP 930 may specify symbol(s) and starting RB number(s) for each group. For example, with values stated in the DL-MAP 930, Group 1 may start from RB 1 of Symbol 0, and Group 2 may start from RB 6 of Symbol 0. As stated, as long as profile groups may be clearly separately by any method, such as by profile pointers, some embodiments may not have a DL-MAP, and instead rely on the profile pointers.

Figure 9B:
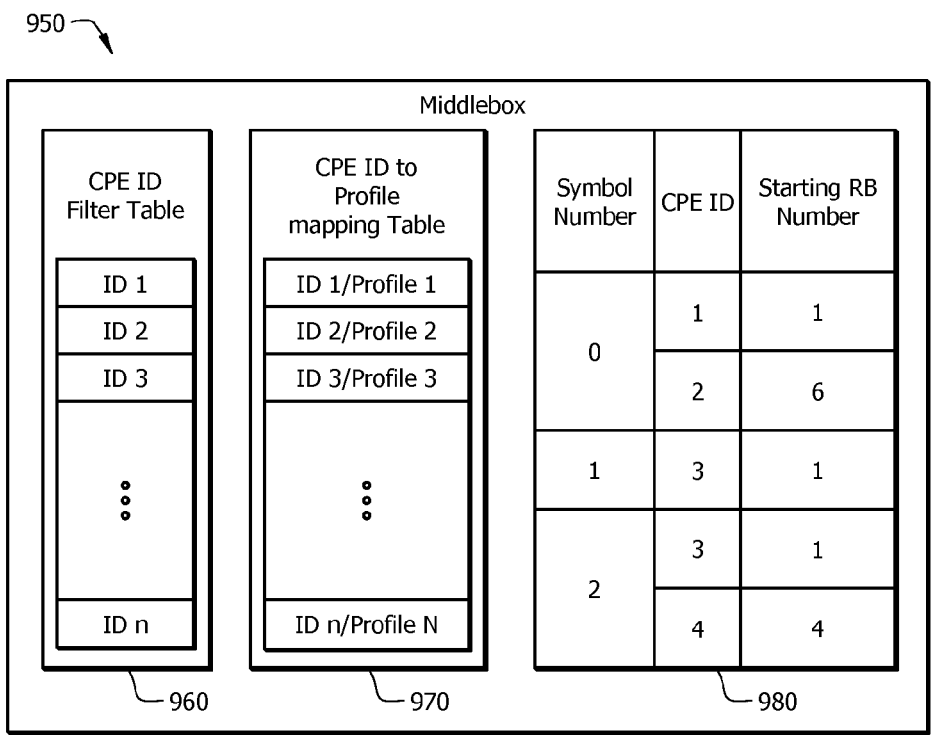

Recall that principles of schemes disclosed herein may be applicable to any general hybrid access network, such as the hybrid access network 300 in FIG. 3. FIG. 9B illustrates an embodiment of a middlebox 950, and the CLT 900 may be considered a specific example of the middlebox 950. Examplary tables with examplary values used for the middlebox 950 include a CPE ID filter table 960, a CPE ID to profile mapping table 970, and a profile pointer table 980. The CPE ID filter table 960 may comprise a list of all CPE IDs known by the middlebox 950, and the LLIDs may be used for identifying CNUs coupled to the middlebox 950. In implementation, the CPE ID filter table 960 may be used as a separate table or as part of another table, such as the mapping table 970 or a bit-loading table. The mapping table 970 may comprise multiple entries to specify which profile a certain CPE (identified by a CPE ID) belongs to. In this regard, the mapping table 970 may serve similar functions as a bit-loading table. The middlebox 950 may use the mapping table 970, or a bit-loading table, or both. The profile pointer table 980 may comprise multiple entries containing multiple profile pointers. To specify each profile pointer, an entry may include information regarding symbol numbers, CPE IDs or group IDs, and starting RB numbers. The profile pointer table 980 may specify symbol(s) and starting RB number(s) for each group. For example, with values stated in the profile pointer table 980, CPE 1 may start from RB 1 of Symbol 0, and CPE 2 may start from RB 6 of Symbol 0. It should be understood that the tables and table entries disclosed herein may be implemented in any other form or as any other suitable data structure, as long as information can be stored and utilized.

FIG. 10 shows an embodiment of an algorithm 1000 in the form of pseudo-codes describing generation of an examplary DL-MAP. The pseudo-codes are straight forward, thus one with ordinary skill in the art will recognize variables, syntaxes, and principles of how the DL-MAP is generated.

After converting Ethernet frames into OFDM symbols according to group profiles, the OFDM symbols may be transmitted downstream by a middlebox to a group of CPEs. Transmission of OFDM symbols involves both the frequency domain and the time domain. Thus, various multiplexing schemes may be used to allocate subcarriers and/or time slots to profile groups.

Figure 11:
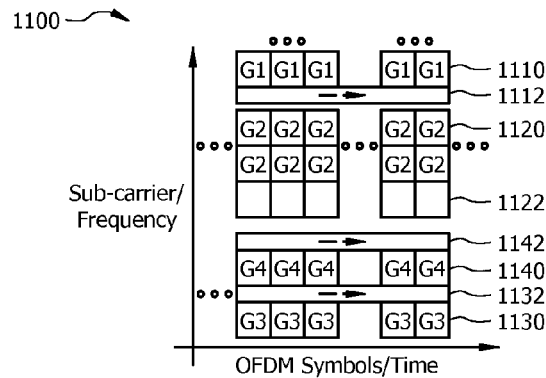
FIG. 11 illustrates an embodiment of a frequency division multiplexing scheme.

FIG. 11 illustrates an embodiment of a frequency division multiplexing scheme 1100, which may be implemented by a middlebox (e.g., the middlebox 330 in FIG. 3). In the scheme 1100, each profile group may be assigned or allocated a set of subcarriers in a distinct frequency range. For example, CPE Group 1 to CPE Group 4 are denoted as G1 to G4 respectively in a hybrid access network (e.g., the hybrid access network 300). Each of the boxes containing G1, G2, G3, and G4 notations may represent an OFDM symbol (or a resource element which does not change principles of frequency division), as shown in FIG. 11. A first group of symbols 1110 are intended for CPE Group 1, a second group of symbols 1120 are intended for CPE Group 2, a third group of symbols 1130 are intended for CPE Group 3, and a fourth group of symbols 1140 are intended for CPE Group 4. In the scheme 1100, the CPE groups are assigned different subcarriers. For example, each of the symbols groups 1110, 1120, 1130, and 1140 may occupy a distinct subcarrier set that does not overlap. Formation of subcarrier sets may be based on plant conditions to accommodate specific bit loading scheme on subcarriers in the OFDM symbols.

Recall that profile pointers may be located in any suitable position and/or have any size, as long as a pointer can be applied to distinguish each of unique profile associated with a specific group of OFDM subcarrier allocation. As shown in FIG. 11, a first group of profile pointers 1112 may be inserted between the symbol groups 1110 and 1120, a second group of profile pointers 1142 may be inserted between the symbol groups 1120 and 1140, and a third group of profile pointers 1132 may be inserted between the symbol groups 1140 and 1130. Each group of profile pointers may also be considered a larger profile pointer. Any group of the profile pointers 1112, 1142, and 1132 may occupy a suitable number of subcarriers to fit its data, and may contain a starting subcarrier or symbol or PRB of a next CPE group. For example, if the frequency range is covered from low to high in transmission, the profile pointers 1132 may comprise starting PRB numbers for symbol group 1140, the profile pointers 1142 may comprise starting PRB numbers for symbol group 1120, and profile pointers 1112 may comprise starting PRB numbers for symbol group 1110.

By using the scheme 1100, the middlebox may transmit multiple bitstreams to multiple CPE groups simultaneously. Each bitstream comprises OFDM symbols on different sets of subcarriers. Note that some of the subcarriers, e.g., a set of subcarriers 1122, in the frequency range may be incapable of carrying data, in which case these subcarriers may be muted or skipped in modulation and subsequent transmission.

Figure 12:
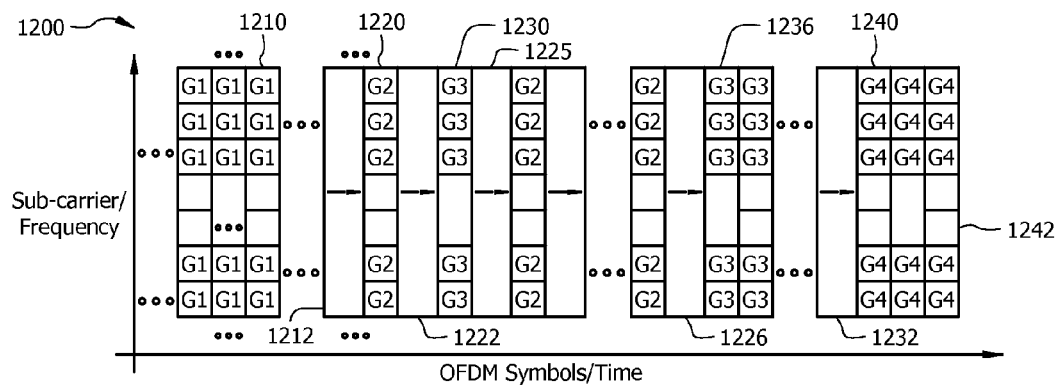
FIG. 12 illustrates an embodiment of a time division multiplexing scheme.

FIG. 12 illustrates an embodiment of a time division multiplexing scheme 1200, which may be implemented by a middlebox (e.g., the middlebox 330 in FIG. 3). Some aspects of the scheme 1200 are similar to the scheme 1100, thus further description may focus on differences. In the scheme 1200, each profile group may be assigned a set of distinct time slots. In other words, groups of symbols intended different CPE groups may occupy different transmission time slots or periods that do not overlap. As shown in FIG. 12, a first group of symbols 1210 intended for CPE Group 1 is transmitted first, followed by transmission of a second group of symbols 1220 intended for CPE Group 2, then followed by transmission of a third group of symbols 1230 intended for CPE Group 3. Each CPE group may be assigned with time slots that are consecutive or not dispersed. For example, a fourth group of symbols 1225 intended again for CPE Group 2 may again be transmitted after the symbols 1230. Similarly, symbols 1236 intended for CPE Group 3 may be transmitted after symbols 1225 and followed by symbols 1240 intended for CPE Group 4. Each group of symbols may last in time for at least one symbol duration, and may occupy in frequency a portion or all of the subcarriers. A time slot may represent one symbol duration. Division of time slots may be based on plant conditions or other factors.

Profile pointers may be located in any suitable position. As shown in FIG. 12, a first group of profile pointers 1212 may be transmitted in a time slot between the symbol groups 1210 and 1220, a second group of profile pointers 1222 may be transmitted between the symbol groups 1220 and 1230. Other profile pointers such as pointers 1226 and 1232 are transmitted similarly. In general, whenever there is a switch or change of intended group, a group of profile pointers may be used to specify a starting position for a next group. Any group of the profile pointers 1212, 1222, 1226, and 1232 may occupy a suitable temporal duration, which should be sufficiently long to transmit data contained in the group of profile pointers. A group of profile pointers may contain a starting subcarrier or symbol or PRB of a next symbol group. Note that some of the subcarriers, e.g., a set of subcarriers 1242, in the frequency range may be incapable of carrying data, in which case these subcarriers may be muted or skipped in modulation and subsequent transmission for all time slots.

Figure 13:
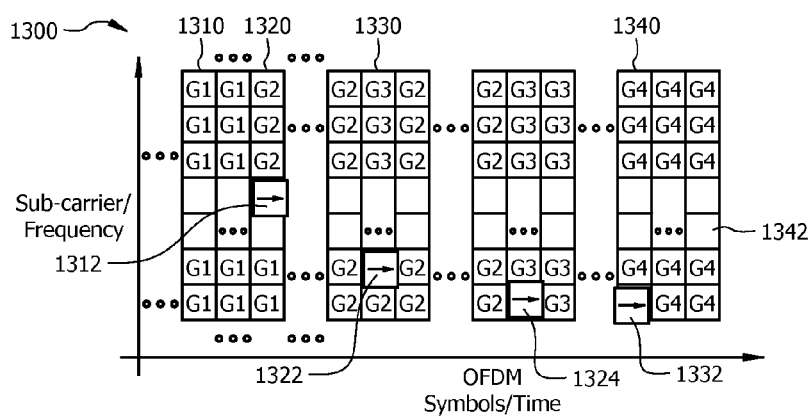
FIG. 13 illustrates an embodiment of a time division and frequency division multiplexing scheme.

FIG. 13 illustrates an embodiment of a time division and frequency division multiplexing scheme 1300, which may be implemented by a middlebox (e.g., the middlebox 330 in FIG. 3). The scheme 1300 may be considered a combination of the schemes 1100 and 1200. Thus, some aspects of the scheme 1300 are similar to the scheme 1100 or 1200, and further description may focus on differences. In the scheme 1300, subcarrier sets and time slots assigned to profile groups may overlap. However, profile pointers may still serve to indicate the ending of one group of symbols and the start of another group of symbols. For example, as shown in FIG. 13, in first and second time slots, a first group of symbols 1310 intended for CPE Group 1 is transmitted first occupying all subcarriers.

Then, in a third time slot, some symbols in the group 1310 occupying only a first portion of the subcarriers may be transmitted. Simultaneously, other symbols in a second group of symbols 1320 covering only a second portion of the subcarriers may be transmitted in the third time slot. Subsequent transmission of groups of symbols 1330 and 1340 is similar.

As shown in FIG. 13, a first profile pointer 1312 may be transmitted in the third time slot and may occupy subcarrier(s) between the symbol groups 1310 and 1320. Similarly, profile pointer 1322, profile pointer 1324, and profile pointer 1332 may be inserted between symbol groups and transmitted. In general, whenever there is a switch or change of intended CPE group, a group of profile pointers may be used to specify a starting position for a next group. Any group of the profile pointers 1312, 1322, 1324, and 1332 may occupy a suitable number of subcarriers, which should hold all data contained in the profile pointer. Note that some of the subcarriers, e.g., a set of subcarriers 1342, in the frequency range may be incapable of carrying data, in which case these subcarriers may be muted or skipped in modulation and subsequent transmission for all time slots.

Figure 14:
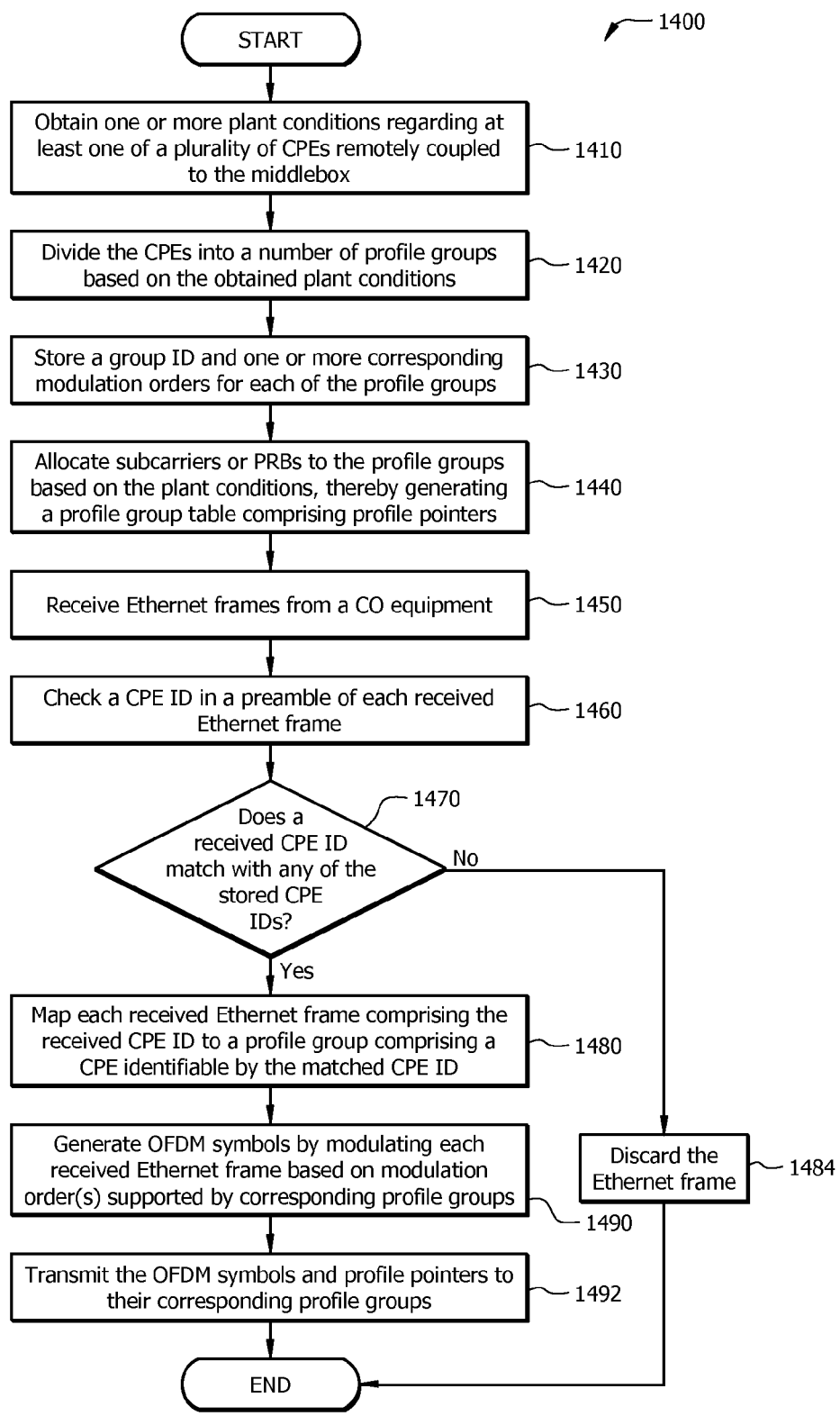
FIG. 14 illustrates an embodiment of a downstream data delivery method.

FIG. 14 illustrates an embodiment of a downstream data delivery method 1400, which may be implemented by a middlebox (e.g., the middlebox 330 in FIG. 3) in a hybrid access network. The method 1400 may start in step 1410, in which the method 1400 may obtain one or more plant conditions regarding at least one of a plurality of CPEs remotely coupled to the middlebox. Depending on the implementation, the one or more plant conditions may include, but are not limited to, one or more of SNR, crosstalk, data rate, cable plant impairment, burst noise, impulse noise from long-term evolution (LTE) device(s) or other device(s), cable impedance, any other relevant parameter, and combinations thereof. In step 1420, the method 1400 may classify or divide the CPEs into a number of profile groups based on the obtained plant conditions. The division process may generate a bit-loading table, a CPE ID to profile mapping table, a CPE ID filter table, any other table or suitable data structure, or combinations thereof. In step 1430, the method 1400 may store a group ID and one or more corresponding modulation orders for each of the profile groups. In step 1440, the method 1400 may allocate subcarriers or PRBs to the profile groups based on the plant conditions, thereby generating a profile group table comprising profile pointers.

In step 1450, the method 1400 may receive Ethernet frames from a CO equipment. For example, a first plurality of Ethernet frames intended for a first profile group and a second plurality of Ethernet frames intended for a second profile group may be received. Note that the first and second plurality of Ethernet frames may have same or different downstream data. In some embodiments, they may be the same Ethernet frames, since the middlebox may process the same Ethernet frames differently for CPEs belonging to different profile groups. In step 1460, the method 1400 may check a CPE ID in a preamble of each received Ethernet frame. In step 1470, the method 1400 may determine whether a received CPE ID match with any of the stored CPE IDs. If the condition in step 1470 is met, the method 1400 may proceed to step 1480. Otherwise, the method 1400 may proceed to step 1484, where the received Ethernet frame is discarded.

In step 1480, the method 1400 may map each received Ethernet frame comprising the received CPE ID to a profile group comprising a CPE identifiable by the matched CPE ID. In step 1490, the method 1400 may generate OFDM symbols by modulating each received Ethernet frame based on modulation order(s) supported by corresponding profile groups. In step 1492, the method 1400 may transmit the OFDM symbols and profile pointers to their corresponding profile groups. According to embodiments disclosed herein, the OFDM symbols may be locally broadcasted or unicasted, but not globally to all profile groups. Further, one or more profile pointers may be transmitted on any suitable set of subcarriers or in any suitable time slot, as long as they specify a starting subcarrier or starting PRB of a next profile group.

It should be understood by one with ordinary skill in the art that modification and variations may be applied to the method 1400 within the scope of this disclosure. For example, Ethernet frames may be received by a middlebox in groups and then processed in groups. Alternatively, each received Ethernet frame may be processed sequentially one by one. For another example, monitoring or obtaining plant condition information may be performed periodically or continuously, and profile groups may be updated regularly.

Figure 15:
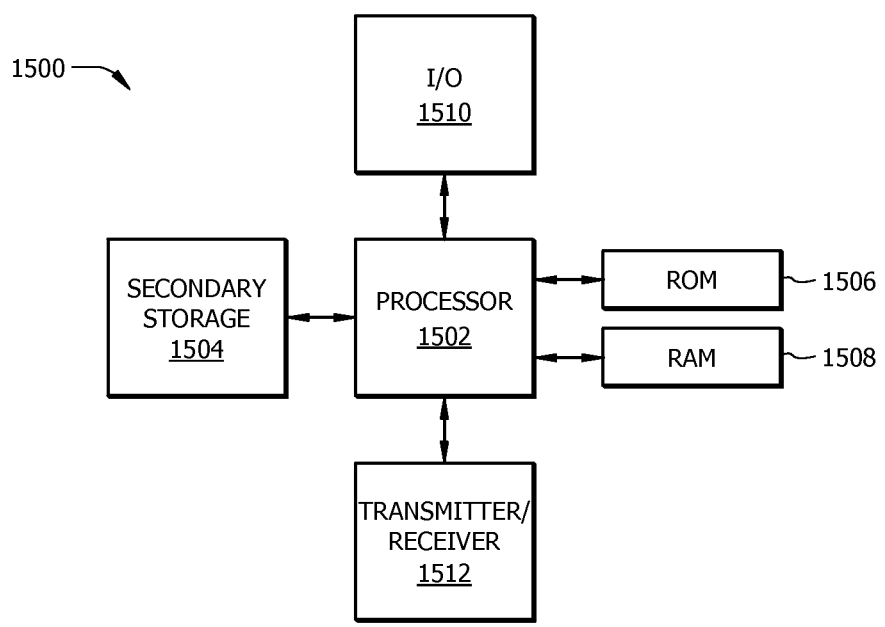
FIG. 15 is a schematic diagram of an embodiment of a network node.

The schemes described above may be implemented on a network component, such as a computer or network component with sufficient processing power, memory resources, and network throughput capability to handle the necessary workload placed upon it. FIG. 15 is a schematic diagram of an embodiment of a network component or node 1500 suitable for implementing one or more embodiments of the systems and methods disclosed herein, such as the grouping scheme 600, the grouping scheme 700, the group profile tables 800 and 850, the CLTs 150, the frequency division multiplexing scheme 1100, the time division multiplexing scheme 1200, the time division and frequency division multiplexing scheme 1300, and the downstream data delivery method 1400.

The network node 1500 includes a processor 1502 that is in communication with memory devices including secondary storage 1504, read only memory (ROM) 1506, random access memory (RAM) 1508, input/output (I/O) devices 1510, and transmitter/receiver 1512. Although illustrated as a single processor, the processor 1502 is not so limited and may comprise multiple processors. The processor 1502 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1502 may be configured to implement any of the schemes described herein, including the grouping scheme 600, the grouping scheme 700, the group profile tables 800 and 850, the CLTs 150, the frequency division multiplexing scheme 1100, the time division multiplexing scheme 1200, the time division and frequency division multiplexing scheme 1300, and the downstream data delivery method 1400. The processor 1502 may be implemented using hardware or a combination of hardware and software.

The secondary storage 1504 is typically comprised of one or more disk drives or tape drives and is used for non-volatile storage of data and as an over-flow data storage device if the RAM 1508 is not large enough to hold all working data. The secondary storage 1504 may be used to store programs that are loaded into the RAM 1508 when such programs are selected for execution. The ROM 1506 is used to store instructions and perhaps data that are read during program execution. The ROM 1506 is a non-volatile memory device that typically has a small memory capacity relative to the larger memory capacity of the secondary storage 1504. The RAM 1508 is used to store volatile data and perhaps to store instructions. Access to both the ROM 1506 and the RAM 1508 is typically faster than to the secondary storage 1504.

The transmitter/receiver 1512 may serve as an output and/or input device of the network node 1500. For example, if the transmitter/receiver 1512 is acting as a transmitter, it may transmit data out of the network node 1500. If the transmitter/receiver 1512 is acting as a receiver, it may receive data into the network node 1500. Further, the transmitter/receiver 1512 may include one or more optical transmitters, one or more optical receivers, one or more electrical transmitters, and/or one or more electrical receivers. The transmitter/receiver 1512 may take the form of modems, modem banks, Ethernet cards, universal serial bus (USB) interface cards, serial interfaces, token ring cards, fiber distributed data interface (FDDI) cards, and/or other well-known network devices. The transmitter/receiver 1512 may enable the processor 1502 to communicate with an Internet or one or more intranets. I/O devices 1510 may include a video monitor, liquid crystal display (LCD), touch screen display, or other type of video display for displaying video, and may also include a video recording device for capturing video. I/O devices 1510 may also include one or more keyboards, mice, or track balls, or other well-known input devices.

It is understood that by programming and/or loading executable instructions onto the network node 1500, at least one of the processor 1502, the secondary storage 1504, the RAM 1508, and the ROM 1506 are changed, transforming the network node 1500 in part into a particular machine or apparatus (e.g., a middlebox having the functionality taught by the present disclosure). The executable instructions may be stored on the secondary storage 1504, the ROM 1506, and/or the RAM 1508 and loaded into the processor 1502 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   an optical interface configured to couple to an optical line;
   an electrical interface configured to couple to electrical lines;
   a profile generation module coupled to the electrical interface and configured to:
   obtain one or more plant conditions regarding at least one of a plurality of customer premises equipments (CPEs) remotely coupled to the apparatus via the electrical lines;
   divide the CPEs into a number of profile groups based on the one or more plant conditions, wherein the profile groups comprise a first profile group and a second profile group, wherein each profile group comprises at least one CPE and supports one or more modulation orders, and wherein the one or more plant conditions include one or more of data rate, signal-to-noise ratio (SNR), crosstalk, cable plant impairment, burst noise, impulse noise from other devices, and cable impedance; and store a group identifier (ID) and one or more corresponding modulation orders for each of the profile groups; and an orthogonal frequency-division multiplexing (OFDM) modulation module configured to:

generate a first plurality of OFDM symbols by modulating a first plurality of frames based on one or more modulation orders of the first profile group; and generate a second plurality of OFDM symbols by modulating a second plurality of frames based on one or more modulation orders of the second profile group, wherein the apparatus is configured to allocate physical resource blocks (PRBs) to each of the profile groups based on the plant conditions.

2. The apparatus of claim 1, wherein the apparatus is further configured to allocate the PRBs using frequency-division multiplexing (FDM), time-division multiplexing (TDM), or both, and wherein the apparatus further comprises a transmitter coupled to the OFDM modulation module and configured to:

transmit the first plurality of OFDM symbols to the first profile group based on allocation of the PRBs; and transmit the second plurality of OFDM symbols to the second profile group based on allocation of the PRBs.

3. The apparatus of claim 2, wherein the apparatus is further configured to generate one or more profile pointers based on the allocation of PRBs to specify a starting PRB corresponding to the second profile group, and wherein the transmitter is further configured to transmit the one or more profile pointers.

4. The apparatus of claim 2, wherein each of the CPEs is identifiable by each of a plurality of CPE IDs, wherein the profile generation module is further configured to store the CPE IDs, wherein the apparatus further comprises a receiver coupled to the optical interface and configured to receive, prior to generation of the first and second plurality of OFDM symbols, the first and second plurality of frames from a central office (CO) via an optical line, and wherein the processor is further configured to:

check, for each of the received first and second plurality of frames, a preamble of the frame to read a received CPE ID;

discard the frame if the received CPE ID does not match with any of the stored CPE IDs; and map the received frame to one of the profile groups if the received CPE ID matches a stored CPE ID.

5. The apparatus of claim 4, wherein the CPE IDs are logical link identifiers (LLIDs), the CPEs are coax network units (CNUs), and the CO is an optical line terminal (OLT).

6. The apparatus of claim 4, wherein the CPE IDs are destination addresses (Das), the CPEs are at least one of cable modems (CMs) and set-top boxes (STBs), and the CO is a cable modem termination system (CMTS).

7. A method implemented in a middlebox remotely coupled to a plurality of customer premises equipments (CPEs), the method comprising:

obtaining one or more plant conditions regarding at least one of the CPEs;

dividing the CPEs into a number of profile groups based on the plant conditions, wherein each profile group supports one or more modulation orders, wherein each profile group is identifiable by each of a number of group identifiers (IDs), and wherein the profile groups comprise a first profile group and a second profile group;

storing, for each profile group, a group ID and one or more corresponding modulation orders;

allocating a plurality of subcarriers to the profile groups based on the plant conditions, wherein a downstream communication channel between the middlebox and the CPEs uses a frequency range comprising the subcarriers;

generating a first plurality of orthogonal frequency-division multiplexing (OFDM) symbols by modulating a first plurality of Ethernet frames based on one or more modulation orders of the first profile group;

generating a second plurality of OFDM symbols by modulating a second plurality of Ethernet frames based on one or more modulation orders of the second profile group;

transmitting the first plurality of OFDM symbols to the first profile group based on allocation of the subcarriers; and transmitting the second plurality of OFDM symbols to the second profile group based on allocation of the subcarriers.

8. The method of claim 7, further comprising:

generating one or more profile pointers based on the allocation of subcarriers to specify a starting subcarrier corresponding to the second profile group; and transmitting the one or more profile pointers as part of the first plurality of OFDM symbols, as part of the second plurality of OFDM symbols, or as additional OFDM symbols.

9. The method of claim 7, wherein the first plurality of OFDM symbols is on a first set of subcarriers in a frequency domain and is transmitted in a first time slot in a time domain, and wherein the second plurality of OFDM symbols is on a second set of subcarriers and is transmitted in the first time slot.

10. The method of claim 7, wherein the first plurality of OFDM symbols is transmitted in a first time slot, and wherein the second plurality of OFDM symbols is transmitted in a second time slot subsequent in time to the first time slot.

11. The method of claim 8, wherein the first plurality of OFDM symbols is transmitted in a first time slot and a second time slot, wherein the one or more profile pointers are transmitted in the second time slot, wherein the second plurality of OFDM symbols is transmitted in the second time slot and a third time slot, wherein the first plurality of OFDM symbols in the first time slot and the second plurality of OFDM symbols in the third time slot share at least some subcarriers, and wherein each of the first plurality of OFDM symbols, the second plurality of OFDM symbols, and the one or more profile pointers occupies a distinct set of subcarriers in the second time slot.

12. An apparatus comprising:

a receiver configured to receive optical signals via an optical line;

an optical-to-electrical converter (OEC) coupled to the receiver and configured to convert the optical signals to electrical signals;

at least one component coupled to the OEC and configured to:

determine signal-to-noise ratio (SNR) performance for each of a plurality of remote devices;

assign each remote device to one of a plurality of groups, wherein each remote device in a group has a similar SNR performance;

assign one of a plurality of profiles to each group, wherein a profile is a list of modulations that are used for subcarriers within an orthogonal frequency-division multiplexing (OFDM) channel; and modulate the electrical signals based on the profiles to create modulated symbols; and a transmitter coupled to the at least one component and configured to transmit the modulated symbols to the remote devices via electrical lines.

13. The apparatus of claim 12, wherein the apparatus is one of a fiber coaxial unit (FCU), a coaxial line terminal (CLT), a hybrid fiber-coaxial (HFC) node, an optical converter unit (OCU), a coaxial media converter (CMC), a media converter (MC), and a middlebox.

14. The apparatus of claim 12, wherein the remote devices are one of coaxial network units (CNUs), cable modem (CMs), a set-top boxes (STBs), and customer premises equipments (CPEs).

15. The apparatus of claim 12, wherein the profiles differ in modulation orders assigned to each subcarrier.

16. The apparatus of claim 12, wherein the at least one component comprises a buffer for each profile.

17. The apparatus of claim 1, wherein the first plurality of frames is a first plurality of Ethernet frames and the second plurality of frames is a second plurality of Ethernet frames.

18. The apparatus of claim 1, wherein the first plurality of frames is a first plurality of Data Over Cable Service Interface Specification (DOCSIS) frames and the second plurality of frames is a second plurality of DOCSIS frames.

* * * * *